(12) United States Patent
Lewis

(10) Patent No.: US 10,674,373 B1
(45) Date of Patent: Jun. 2, 2020

(54) METHOD AND SYSTEM FOR IMPLEMENTING DRONE-BASED RADIO FREQUENCY (RF) SITE SURVEY

(71) Applicant: CenturyLink Intellectual Property LLC, Broomfield, CO (US)

(72) Inventor: Ronald A. Lewis, Bastrop, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 16/363,902

(22) Filed: Mar. 25, 2019

Related U.S. Application Data

(60) Provisional application No. 62/790,208, filed on Jan. 9, 2019.

(51) Int. Cl.
| | |
|---|---|
| *H04W 40/00* | (2009.01) |
| *H04W 16/18* | (2009.01) |
| *H04B 1/00* | (2006.01) |
| *H04W 24/10* | (2009.01) |

(52) U.S. Cl.
CPC .......... *H04W 16/18* (2013.01); *H04B 1/0064* (2013.01); *H04W 24/10* (2013.01)

(58) Field of Classification Search
CPC ..... H04W 16/02; H04W 16/14; H04W 16/28; H04W 24/02; H04W 4/024; H04W 4/33; H04W 84/005; H04W 84/06; H04W 88/08
USPC .................................. 455/404.2, 404.1, 446
See application file for complete search history.

(56) References Cited

U.S. PATENT DOCUMENTS

| | | | | |
|---|---|---|---|---|
| 9,363,690 | B1* | 6/2016 | Singh | H04W 24/02 |
| 9,816,783 | B1* | 11/2017 | Means | F41G 3/26 |
| 9,952,352 | B2* | 4/2018 | Kirby | G01W 1/10 |
| 10,084,556 | B1* | 9/2018 | Young | G08B 21/18 |
| 10,419,903 | B2* | 9/2019 | Singh | H04L 43/16 |
| 2015/0334545 | A1* | 11/2015 | Maier | H04W 4/70 |
| | | | | 455/404.2 |
| 2016/0253907 | A1* | 9/2016 | Taveira | G05D 1/102 |
| | | | | 701/3 |
| 2017/0208512 | A1* | 7/2017 | Aydin | H04B 7/18504 |
| 2018/0183496 | A1* | 6/2018 | Gasnier | H04B 7/0602 |
| 2018/0357909 | A1* | 12/2018 | Eyhorn | B64C 39/024 |
| 2018/0364157 | A1* | 12/2018 | Ghiraldi | A01C 21/007 |
| 2019/0044392 | A1* | 2/2019 | Chowdhury | H02J 50/80 |
| 2019/0208112 | A1* | 7/2019 | Kleinbeck | H04N 5/23299 |

* cited by examiner

*Primary Examiner* — Joseph Arevalo

(57) ABSTRACT

Novel tools and techniques are provided for implementing site survey, and, more particularly, to methods, systems, and apparatuses for implementing drone-based radio frequency ("rf") site survey. In various embodiments, a computing system might receive at least one of a first signal from a first rf sensor or a second signal from a second rf sensor, in response to corresponding at least one of the first rf sensor receiving the first signal within a first operating frequency range or the second rf sensor receiving the second signal within a second operating frequency range as the drone travels through a geographical area; might analyze the received at least one of the first signal or the second signal to identify a frequency range of detected radio signals within the geographical area; and send, to a user device of a user, the identified frequency range of detected radio signals within the geographical area.

19 Claims, 7 Drawing Sheets

US 10,674,373 B1

METHOD AND SYSTEM FOR IMPLEMENTING DRONE-BASED RADIO FREQUENCY (RF) SITE SURVEY

CROSS-REFERENCES TO RELATED APPLICATIONS

This application claims priority to U.S. patent application Ser. No. 62/790,208 (the "'208 application"), filed Jan. 9, 2019 by Ronald A. Lewis, entitled, "Method and System for Implementing Drone-Based Radio Frequency (RF) Site Survey," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing radio site survey, and, more particularly, to methods, systems, and apparatuses for implementing drone-based radio frequency ("rf") site survey.

BACKGROUND

For radio transmission between antennas, signal dispersion may be caused due to obstructions (such as towers, trees, buildings, or the like) between the antennas. Traditionally, service providers might capture data regarding such obstructions that might cause the signal dispersion or signal contention. However, such techniques do not natively capture data regarding spectrum use, and thus would not natively detect data that might cause spectrum contention.

Further, conventional techniques do not utilize drone-based systems that can detect both signal contention caused by obstructions and spectrum contention caused by overlapping or close-frequency signals.

Hence, there is a need for more robust and scalable solutions for implementing site survey, and, more particularly, to methods, systems, and apparatuses for implementing drone-based radio frequency ("rf") site survey.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
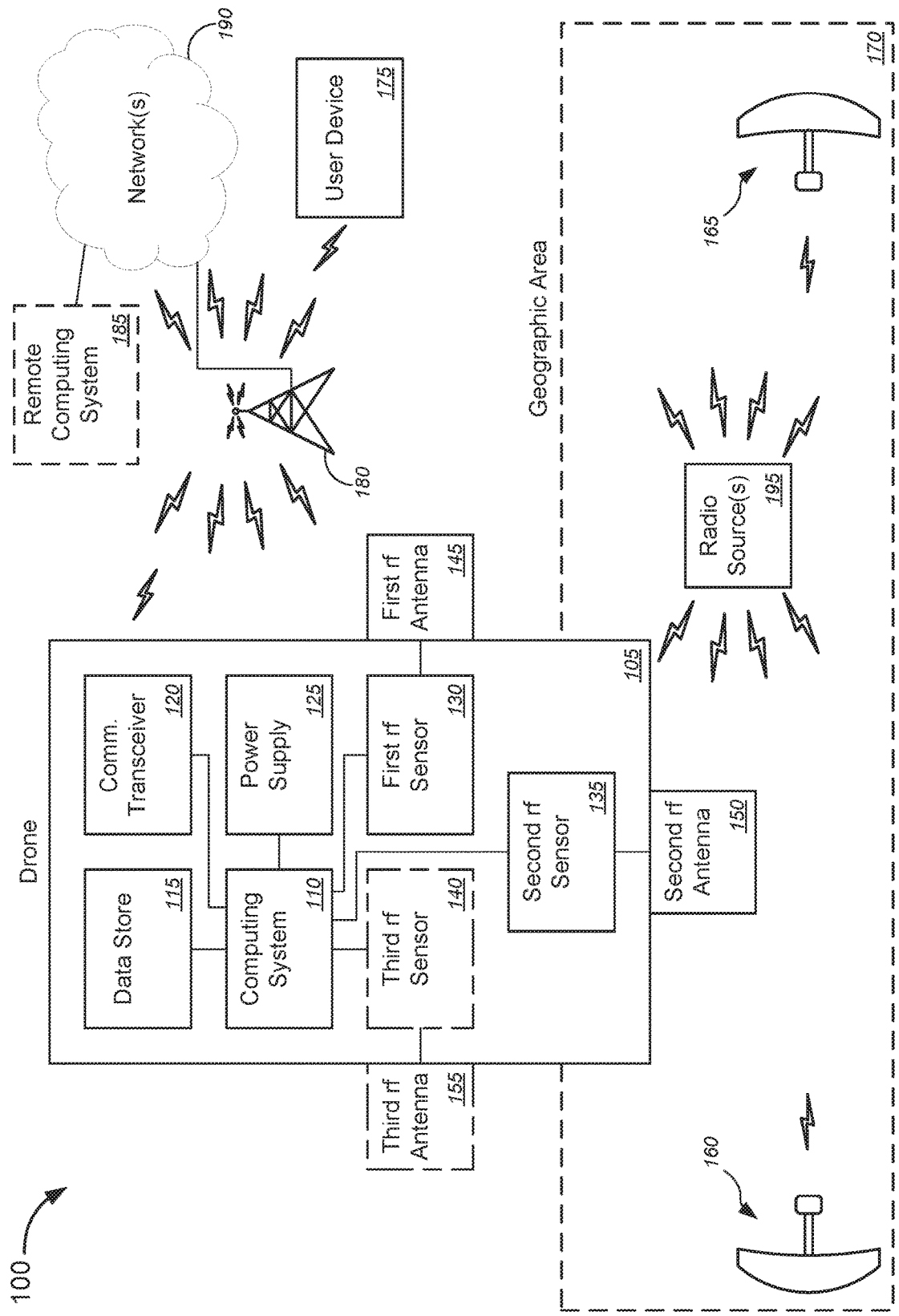
FIG. 1 is a schematic diagram illustrating a system for implementing drone-based radio frequency ("rf") site survey, in accordance with various embodiments.

Various embodiments provide tools and techniques for implementing site survey, and, more particularly, to methods, systems, and apparatuses for implementing drone-based radio frequency ("rf") site survey.

In various embodiments, a computing system might receive at least one of a first signal from a first rf sensor or a second signal from a second rf sensor in response to corresponding at least one of the first rf sensor (having a first operating frequency range) receiving the first signal within the first operating frequency range or the second rf sensor (having a second operating frequency range) receiving the second signal within the second operating frequency range as a drone travels through a first geographical area, the first rf sensor and the second rf sensor being disposed on the drone. The computing system might analyze the received at least one of the first signal or the second signal to identify a frequency range of detected radio signals within the first geographical area, and might send, to a user device of a user, the identified frequency range of detected radio signals within the first geographical area.

In some embodiments, the drone might include, without limitation, one of an aerial drone, a land-based drone, a water-based drone, or an autonomous vehicle, and/or the like. In some cases, the computing system might include, but is not limited to, at least one of an open source IoT platform, a microprocessor, a microcontroller, a processor, a portable computer, a server, a distributed computing system, or a cloud-based computing system, and/or the like. According to some embodiments, each of the first rf sensor, the second rf sensor, or the third rf sensor might include, without limitation, at least one of one or more germanium diode rf detectors, one or more silicon rf detectors, one or more Schottky diode rf detectors, one or more gallium arsenide rf detectors, or one or more copper wires, and/or the like. In some instances, each of the first rf sensor, the second rf sensor, or the third rf sensor might include, but is not limited to, a software defined radio ("SDR"), or the like. Merely by way of example, in some cases, the first operating frequency range might center around 5 GHz, while the second operating frequency range might center around 2.4 GHz, and the third operating frequency range might center around 900

MHz, where wireless communications frequencies used for wireless communications between the computing system and the user device (e.g., 2.5 GHz and 5.8 GHz) might be filtered out to avoid potential operational spectrum contention (which might be filtered via software and/or via appropriate antenna placement, where such antennas might be communicatively coupled to the first, second, and/or third rf sensors).

According to some embodiments, the first geographic area might include, without limitation, one of a customer premises, a residential neighborhood, a business district, a city block, an open nature space, a park, a forest, a mountain range, a valley, or a lake side area, and/or the like. In some cases, the first geographic area might include, but is not limited to, a geographic area along a travel path of the drone, where the travel path is along a radio signal transmission path between two sites intended for placement of corresponding two antennas.

In some aspects, the drone-based system might be used to detect both signal contention caused by obstructions and spectrum contention caused by overlapping or close-frequency signals.

These and other aspects of the drone-based radio frequency ("rf") site survey are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, radio signal detection technology, radio transmission technology, radio tuning technology, and/or the like. In other aspects, certain embodiments, can improve the functioning of user equipment or systems themselves (e.g., radio signal detection system, radio transmission system, radio tuning system, etc.), for example, by monitoring, with a first radio frequency ("rf") sensor having a first operating frequency range, a first geographical area to detect any radio signals within the first operating frequency range within the first geographical area, the first rf sensor being disposed on a drone travelling through the first geographical area; monitoring, with a second rf sensor having a second operating frequency range, the first geographical area to detect any radio signals within the second operating frequency range within the first geographical area, the second rf sensor being disposed on the drone travelling through the first geographical area; receiving, with a computing system, at least one of a first signal from the first rf sensor or a second signal from the second rf sensor in response to corresponding at least one of the first rf sensor receiving the first signal within the first operating frequency range or the second rf sensor receiving the second signal within the second operating frequency range; analyzing, with the computing system, the received at least one of the first signal or the second signal to identify a frequency range of detected radio signals within the first geographical area; sending, with the computing system and to a user device of a user, the identified frequency range of detected radio signals within the first geographical area; and (in some cases) sending, with the computing system, a set of instructions to tune each of two or more antennas to transmit and send signals within a third frequency range that does not overlap with the identified frequency range; and/or the like.

In particular, to the extent any abstract concepts are present in the various embodiments, those concepts can be implemented as described herein by devices, software, systems, and methods that involve specific novel functionality (e.g., steps or operations), such as, using a drone-based system to detect both signal contention caused by obstructions and spectrum contention caused by overlapping or close-frequency signals, and/or the like, to name a few examples, that extend beyond mere conventional computer processing operations. These functionalities can produce tangible results outside of the implementing computer system, including, merely by way of example, optimized detection of both radio frequency signal contention caused by obstructions and spectrum contention caused by overlapping or close-frequency signals, and/or the like, at least some of which may be observed or measured by customers and/or service providers.

In an aspect, a method might comprise monitoring, with a first radio frequency ("rf") sensor having a first operating frequency range, a first geographical area to detect any radio signals within the first operating frequency range within the first geographical area, the first rf sensor being disposed on a drone travelling through the first geographical area; and monitoring, with a second rf sensor having a second operating frequency range, the first geographical area to detect any radio signals within the second operating frequency range within the first geographical area, the second rf sensor being disposed on the drone travelling through the first geographical area. The method might further comprise receiving, with a computing system, at least one of a first signal from the first rf sensor or a second signal from the second rf sensor in response to corresponding at least one of the first rf sensor receiving the first signal within the first operating frequency range or the second rf sensor receiving the second signal within the second operating frequency range; analyzing, with the computing system, the received at least one of the first signal or the second signal to identify a frequency range of detected radio signals within the first geographical area; and sending, with the computing system and to a user device of a user, the identified frequency range of detected radio signals within the first geographical area.

In some embodiments, the drone might comprise one of an aerial drone, a land-based drone, a water-based drone, or an autonomous vehicle, and/or the like. In some cases, the computing system might comprise at least one of an open source IoT platform, a microprocessor, a microcontroller, a processor, a portable computer, a server, a distributed computing system, or a cloud-based computing system, and/or the like. In some instances, each of the first rf sensor or the second rf sensor might comprise at least one of one or more germanium diode rf detectors, one or more silicon rf detectors, one or more Schottky diode rf detectors, one or more gallium arsenide rf detectors, or one or more copper wires, and/or the like. In some cases, each of the first rf sensor or the second rf sensor might comprise a software defined radio ("SDR").

According to some embodiments, the first geographic area might comprise one of a customer premises, a residential neighborhood, a business district, a city block, an open nature space, a park, a forest, a mountain range, a valley, or a lake side area, and/or the like. In some instances, the first geographic area might comprise a geographic area along a travel path of the drone, wherein the travel path might be along a radio signal transmission path between two sites intended for placement of corresponding two antennas.

In some embodiments, the first geographic area might comprise a geographic area between two or more sites intended for placement of corresponding two or more antennas, wherein the two or more antennas might be configured to transmit and send signals within a third frequency range, wherein the method might further comprise: analyzing, with the computing system, the identified frequency range of the detected radio signals to determine whether the identified frequency range overlaps with the third frequency range; and based on a determination that the identified frequency range overlaps with the third frequency range, sending, with the computing system, an alert to the user device of the user indicating presence of potential spectrum contention within the first geographic area. In some cases, the two or more antennas might be installed at the two or more sites, wherein the method might further comprise, based on a determination that the identified frequency range overlaps with the third frequency range, sending, with the computing system, a set of instructions to tune each of the two or more antennas to transmit and send signals within a fourth frequency range that does not overlap with the identified frequency range. The method might further comprise analyzing, with the computing system, the received at least one of the first signal or the second signal to determine presence of signal dispersion indicative of obstructions or signal contention.

Merely by way of example, in some cases, the method might further comprise monitoring, with a third rf sensor having a third operating frequency range, the first geographical area to detect any radio signals within the third operating frequency range within the first geographical area, the third rf sensor being disposed on the drone travelling through the first geographical area. In some instances, receiving the at least one of the first signal from the first rf sensor or the second signal from the second rf sensor might comprise receiving, with the computing system, at least one of a first signal from the first rf sensor, a second signal from the second rf sensor, or a third signal from the third rf sensor in response to corresponding at least one of the first rf sensor receiving the first signal within the first operating frequency range, the second rf sensor receiving the second signal within the second operating frequency range, or the third rf sensor receiving the third signal within the third operating frequency range. In some cases, analyzing the received at least one of the first signal or the second signal might comprise analyzing, with the computing system, the received at least one of the first signal, the second signal, or the third signal to identify a frequency range of detected radio signals within the first geographical area.

In some embodiments, the first operating frequency range might center around 5 GHz, while the second operating frequency range might center around 2.4 GHz, and the third operating frequency range might center around 900 MHz, wherein wireless communications frequencies used for wireless communications between the computing system and the user device might be filtered out to avoid potential operational spectrum contention.

In another aspect, a drone might be configured to implement radio frequency ("rf") site survey, the drone comprising a first rf sensor having a first operating frequency range; a second rf sensor having a second operating frequency range; and a computing system. The computing system might comprise at least one processor and a non-transitory computer readable medium communicatively coupled to the at least one processor. The non-transitory computer readable medium might have stored thereon computer software comprising a set of instructions that, when executed by the at least one processor, causes the computing system to: receive at least one of a first signal from the first rf sensor or a second signal from the second rf sensor in response to corresponding at least one of the first rf sensor receiving the first signal within the first operating frequency range or the second rf sensor receiving the second signal within the second operating frequency range as the drone travels through a first geographical area; analyze the received at least one of the first signal or the second signal to identify a frequency range of detected radio signals within the first geographical area; and send, to a user device of a user, the identified frequency range of detected radio signals within the first geographical area.

In some embodiments, the drone might comprise one of an aerial drone, a land-based drone, a water-based drone, or an autonomous vehicle, and/or the like. In some cases, the computing system might comprise at least one of an open source IoT platform, a microprocessor, a microcontroller, a processor, a portable computer, a server, a distributed computing system, or a cloud-based computing system, and/or the like. According to some embodiments, each of the first rf sensor or the second rf sensor might comprise at least one of one or more germanium diode rf detectors, one or more silicon rf detectors, one or more Schottky diode rf detectors, one or more gallium arsenide rf detectors, or one or more copper wires, and/or the like. In some instances, each of the first rf sensor or the second rf sensor might comprise a software defined radio ("SDR").

According to some embodiments, the first geographic area might comprise a geographic area between two or more sites intended for placement of corresponding two or more antennas, where the two or more antennas might be configured to transmit and send signals within a third frequency range. The set of instructions, when executed by the at least one processor, might further cause the computing system to: analyze the identified frequency range of the detected radio signals to determine whether the identified frequency range overlaps with the third frequency range; and based on a determination that the identified frequency range overlaps with the third frequency range, send an alert to the user device of the user indicating presence of potential spectrum contention within the first geographic area.

In some embodiments, the drone might further comprise a third rf sensor having a third operating frequency range. In some instances, receiving the at least one of the first signal from the first rf sensor or the second signal from the second rf sensor might comprise receiving at least one of a first signal from the first rf sensor, a second signal from the second rf sensor, or a third signal from the third rf sensor in response to corresponding at least one of the first rf sensor receiving the first signal within the first operating frequency range, the second rf sensor receiving the second signal within the second operating frequency range, or the third rf sensor receiving the third signal within the third operating frequency range. In some cases, analyzing the received at least one of the first signal or the second signal might comprise analyzing the received at least one of the first signal, the second signal, or the third signal to identify a frequency range of detected radio signals within the first geographical area.

Merely by way of example, in some cases, the first operating frequency range might center around 5 GHz, while the second operating frequency range might center around 2.4 GHz, and the third operating frequency range might center around 900 MHz, wherein wireless communications frequencies used for wireless communications between the computing system and the user device might be filtered out to avoid potential operational spectrum contention.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing site survey, and, more particularly, to methods, systems, and apparatuses for implementing drone-based radio frequency ("rf") site survey, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing drone-based radio frequency ("rf") site survey, in accordance with various embodiments.

In the non-limiting embodiment of FIG. 1, system 100 might comprise a drone 105. In some embodiments, the drone 105 might comprise a computing system 110, a data store 115, a communications transceiver 120, a power supply 125, a first rf sensor 130, a second rf sensor 135, a third rf sensor 140 (optional), a first rf antenna 145, a second rf antenna 150, and a third rf antenna 155 (optional). The first rf antenna 145, the second rf antenna 150, and the third rf antenna 155 (collectively, "rf antennas 145-155" or the like) might communicatively couple to corresponding first rf sensor 130, second rf sensor 135, and third rf sensor 140.

In some embodiments, the drone 105 might include, without limitation, one of an aerial drone, a land-based drone, a water-based drone, or an autonomous vehicle, and/or the like. In some cases, the computing system 110 might include, but is not limited to, at least one of an open source IoT platform, a microprocessor, a microcontroller, a processor, or a portable computer, and/or the like. According to some embodiments, each of the first rf sensor 130, the second rf sensor 135, or the third rf sensor 140 might include, without limitation, at least one of one or more germanium diode rf detectors, one or more silicon rf detectors, one or more Schottky diode rf detectors, one or more gallium arsenide rf detectors, or one or more copper wires, and/or the like. In some instances, each of the first rf sensor 130, the second rf sensor 135, or the third rf sensor 140 might include, but is not limited to, a software defined radio ("SDR"), or the like. Merely by way of example, in some cases, the first operating frequency range might center around 5 GHz (with frequency bandwidth ranging from 10 Hz to 500 MHz or the like), while the second operating frequency range might center around 2.4 GHz (with frequency bandwidth ranging from 10 Hz to 500 MHz or the like), and the third operating frequency range might center around 900 MHz (with frequency bandwidth ranging from 10 Hz to 100 MHz or the like), where wireless communications frequencies used for wireless communications between the computing system and the user device (e.g., 2.5 GHz and 5.8 GHz) might be filtered out to avoid potential operational spectrum contention (which might be filtered via software and/or via appropriate placement of antennas 145-155, where such antennas 145-155 might be communicatively coupled to the first, second, and/or third rf sensors 130-140).

In some embodiments, system 100 might further comprise a first antenna 160 and a second antenna 165 that are disposed within a geographic or geographical area 170. In some cases, each of the first antenna 160 or the second antenna 165 might include, without limitation, at least one of a parabolic reflector-based antenna, a Yagi-Uda antenna, a beam antenna, a parasitic array antenna, a loop antenna, a dipole antenna, or a monopole antenna, and/or the like. According to some embodiments, the geographic area 170 might include, without limitation, one of a customer premises, a residential neighborhood, a business district, a city block, an open nature space, a park, a forest, a mountain range, a valley, or a lake side area, and/or the like. In some cases, the geographic area 170 might include, but is not limited to, a geographic area along a travel path of the drone 105, where the travel path is along a radio signal transmission path between two sites intended for placement of corresponding two antennas 160 and 165.

System 100 might further comprise a user device 175 associated with a user—including, but not limited to, an operator, a technician, a representative, or a customer of a service provider, or the like. System 100 might also comprise one or more telecommunications relay systems 180, which might include, without limitation, one or more wireless network interfaces (e.g., wireless modems, wireless access points, and the like), one or more towers, one or more satellites, and/or the like. System 100 might further comprise network(s) 190 (optional) and one or more remote computing systems 185 (optional). In some cases, the network(s) 190 might include, without limitation, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 190 might each include an access network of the service provider (e.g., an Internet service provider ("ISP")). In another embodiment, the network(s) 190 might each include a core network of the service provider, and/or the Internet.

In some instances, the one or more remote computing systems 185 might include, but is not limited to, an open source IoT platform, a microprocessor, a microcontroller, a processor, a portable computer, a server, a distributed computing system, or a cloud-based computing system, and/or the like. According to some embodiments, system 100 might further comprise one or more radio sources 195, which might include, without limitation, one or more unregistered radio sources, one or more registered radio sources, one or more amateur radio sources, one or more cellular phones, one or more cordless phones, one or more local wireless networks, one or more WiFi sources or transceivers, one or more medical scanners, one or more microwave ovens, one or more radio frequency identification ("RFID") tags, one or more FM radios, one or more AM radios, one or more television broadcasting systems, one or more radar sources, very low frequency ("VLF") sources, low frequency ("LF") sources, medium frequency ("MF") sources, high frequency ("HF") sources, very high frequency ("VHF") sources, ultra high frequency ("UHF") sources, super high frequency ("SHF") sources, extremely high frequency ("EHF") sources, tremendously high frequency ("THF") sources, or radio signals reflecting off buildings, man-made structures, foliage or flora, or other obstructions, and/or the like. The radio source(s) 195 might be stationary or mobile.

The lightning bolt symbols in FIG. 1 are used to denote wireless communications between the one or more telecommunications relay systems 150 and the computing system 110 via the communications transceiver 120 of drone 105, between the one or more telecommunications relay systems 150 and the user device 175, between the one or more telecommunications relay systems 150 and network(s) 190, between the one or more telecommunications relay systems 150 and the one or more remote systems 185 via network(s) 190, between the first antenna 160 and the second antenna 165, between the radio source(s) 195 and the first rf sensor 130 via the first rf antenna 145, between the radio source(s) 195 and the second rf sensor 135 via the second rf antenna 150, between the radio source(s) 195 and the third rf sensor 140 via the third rf antenna 155, and/or the like.

In operation, the first rf sensor 130—which is disposed on drone 105 and which might have a first operating frequency range (e.g., a range centered around 5 GHz or the like, with frequency bandwidth ranging from 10 Hz to 500 MHz or the like)—might monitor the geographical area 170 to detect any radio signals (such as from radio source(s) 195 or the like) within the first operating frequency range within the geographical area 170. In a similar manner, the second rf sensor 135—which is disposed on drone 105 and which might have a second operating frequency range (e.g., a range centered around 2.4 GHz or the like, with frequency bandwidth ranging from 10 Hz to 500 MHz or the like)—might monitor the geographical area 170 to detect any radio signals (such as from radio source(s) 195 or the like) within the second operating frequency range within the geographical area 170. In cases that the third rf sensor 140 and the third rf antenna 155 are present and used, the third rf sensor 140—which is disposed on drone 105 and which might have a third operating frequency range (e.g., a range centered around 900 MHz or the like, with frequency bandwidth ranging from 10 Hz to 100 MHz or the like)—might monitor the geographical area 170 to detect any radio signals (such as from radio source(s) 195 or the like) within the third operating frequency range within the geographical area 170.

The computing system 110 (or the remote computing system(s) 185, via communications transceiver 120, telecommunications relay system(s) 180, and network(s) 190) might receive at least one of a first signal from the first rf sensor 130, a second signal from the second rf sensor 135, or a third signal from the third rf sensor 140 (in cases where the third rf sensor 140 monitors the geographical area 170) in response to corresponding at least one of the first rf sensor 130 receiving, via the first rf antenna 145, the first signal within the first operating frequency range, the second rf sensor 135 receiving, via the second rf antenna 150, the second signal within the second operating frequency range, or the third rf sensor 140 receiving, via the third rf antenna 155, the third signal within the third operating frequency range (in cases where the third rf sensor 140 monitors the geographical area 170), where the radio source(s) 195 might emit radio frequency signals that are received as corresponding at least one of the first signal, the second signal, or the third signal. The computing system 110 (and in some cases, remote computing system 185) might analyze the received at least one of the first signal, the second signal, or the third signal to identify a frequency range of detected radio signals (i.e., the radio frequency signals emitted by the radio source(s) 195, or the like) within the geographical area 170. The computing system 110 (and in some cases, remote computing system 185) might then send, to the user device 175 (which may be associated with a user (such as an operator, a technician, a representative, or a customer of a service provider, or the like)).

In some embodiments, the geographic area 170 might include, without limitation, a geographic area between two or more sites intended for placement of corresponding two or more antennas (e.g., antennas 160 and 165, or the like), where the two or more antennas might be configured to transmit and send signals within a third frequency range. In such cases, the computing system 110 (or the remote computing system(s) 185) might analyze the identified frequency range of the detected radio signals to determine whether the identified frequency range overlaps with the third frequency range. Based on a determination that the identified frequency range overlaps with the third frequency range, the computing system 110 (or the remote computing system(s) 185) might send an alert to the user device of the user indicating presence of potential spectrum contention within the geographic area 170.

According to some embodiments, the two or more antennas might be installed at the two or more sites, and based on a determination that the identified frequency range overlaps with the third frequency range, the computing system 110 (or the remote computing system(s) 185) might send a set of instructions to tune each of the two or more antennas (e.g., antennas 160 and 165, or the like) to transmit and send signals within a fourth frequency range that does not overlap with the identified frequency range. In some embodiments, the computing system 110 (or the remote computing system(s) 185) might analyze the received at least one of the first signal or the second signal to determine presence of signal dispersion indicative of obstructions or signal contention.

These and other functions of the system 100 (and its components) are described in greater detail below with respect to FIGS. 2-4.

Figure 2:
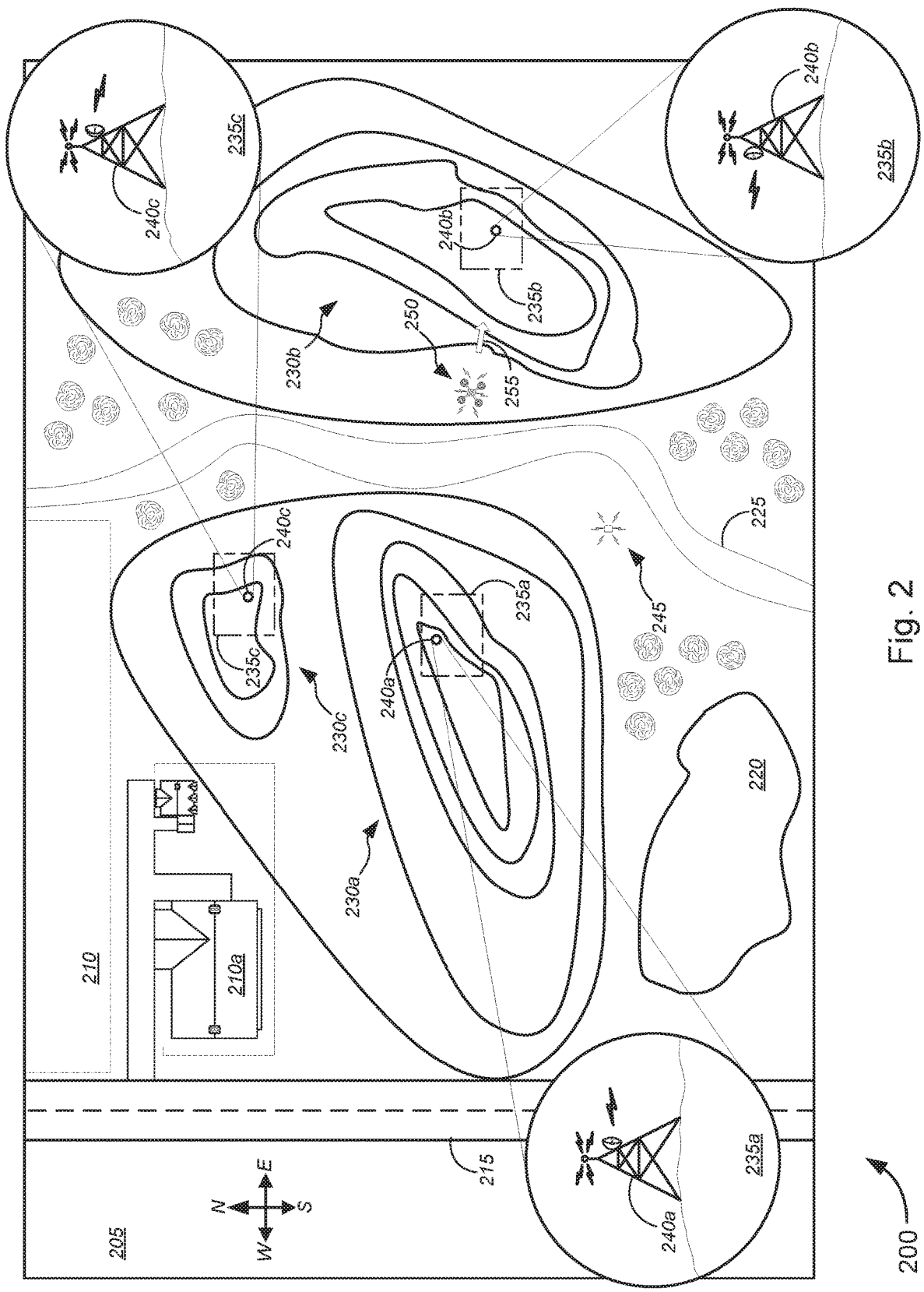
FIG. 2 is a schematic diagram illustrating a non-limiting example of a geographic area in which drone-based rf site survey may be implemented, in accordance with various embodiments.

FIG. 2 is a schematic diagram illustrating a non-limiting example 200 of a geographic area in which drone-based rf site survey may be implemented, in accordance with various embodiments.

With reference to FIG. 2, system 200 might comprise geographic location or region 205 (or "geographic area 205" or the like), which might include, without limitation, one or more agricultural areas 210 (which might be part of an agricultural property, including a farm, a plantation, a ranch, or an orchard, and/or the like), one or more roadways or vehicular paths 215, one or more bodies of water 220 (e.g., lakes or ponds, etc.), one or more waterways or watercourses 225 (e.g., canyons, gorges, rivers, streams, creeks, brooks, rivulets, gullies, rills, aqueducts, or canals, and/or the like), and one or more hills or mountains 230a-230c (collectively, "hills 230" or "mountains 230" or the like), or the like. In some instances, the geographic location 205 may further include (although not expressly depicted in FIG. 2) at least one of an open nature space, a park, a forest, a mountain range, a valley, or a lake side area, and/or the like. In some cases, the one or more agricultural areas 210 might include, but are not limited to, houses, barns, or other structures, and/or the like (collectively, "structures 210a" or the like).

In some embodiments, a first site 235a might be located at the top of the first hill 230a, while a second site 235b might be located at the top of the second hill 230b, and a third site 235c might be located at the top of the third hill 230c. A first antenna 240a might be disposed at the first site 235a, while a second antenna 240b might be disposed at the second site 235b, and a third antenna 240c might be disposed at the third site 235c, and/or the like. In some embodiments, the first antenna 240a, the second antenna 240b, and the third antenna 240c might each include, without limitation, at least one of a parabolic reflector-based antenna, a Yagi-Uda antenna, a beam antenna, a parasitic array antenna, a loop antenna, a dipole antenna, or a monopole antenna, and/or the like.

In some cases, a radio source(s) 245 might be disposed in the geographic location 205. According to some embodiments, the radio source(s) 245 might include, without limitation, one or more unregistered radio sources, one or more registered radio sources, one or more amateur radio sources, one or more cellular phones, one or more cordless phones, one or more local wireless networks, one or more WiFi sources or transceivers, one or more medical scanners, one or more microwave ovens, one or more radio frequency identification ("RFID") tags, one or more FM radios, one or more AM radios, one or more television broadcasting systems, one or more radar sources, very low frequency ("VLF") sources, low frequency ("LF") sources, medium frequency ("MF") sources, high frequency ("HF") sources, very high frequency ("VHF") sources, ultra high frequency ("UHF") sources, super high frequency ("SHF") sources, extremely high frequency ("EHF") sources, tremendously high frequency ("THF") sources, or radio signals reflecting off buildings, man-made structures, foliage or flora, or other obstructions, and/or the like. The radio source(s) 245 might be stationary or mobile.

According to some embodiments, a drone 250 might travel within the geographic area 205. In some cases, the drone 250 might travel along a path through the geographic area 205, in some instances along a path (e.g., as depicted by arrow 255) between two of the antennas 240 (e.g., between the first antenna 240a and the second antenna 240b, between the first antenna 240a and the third antenna 240c, or between the second antenna 240b and the third antenna 240c, or the like), or the like. In some embodiments, the drone 250 might include, without limitation, one of an aerial drone (as depicted in FIG. 2), a land-based drone (not shown), a water-based drone (not shown), or an autonomous vehicle (not shown), and/or the like. Similar to drone 105 as shown in FIG. 1, the drone 250 might comprise (although not shown in FIG. 2) a computing system, a data store, a communications transceiver, a power supply, a first rf sensor, a second rf sensor, a third rf sensor (optional), a first rf antenna, a second rf antenna, and a third rf antenna (optional). The first rf antenna, the second rf antenna, and the third rf antenna (collectively, "rf antennas" or the like) might communicatively couple to corresponding first rf sensor, second rf sensor, and third rf sensor.

In some cases, the computing system might include, but is not limited to, at least one of an open source IoT platform, a microprocessor, a microcontroller, a processor, or a portable computer, and/or the like. According to some embodiments, each of the first rf sensor, the second rf sensor, or the third rf sensor might include, without limitation, at least one of one or more germanium diode rf detectors, one or more silicon rf detectors, one or more Schottky diode rf detectors, one or more gallium arsenide rf detectors, or one or more copper wires, and/or the like. In some instances, each of the first rf sensor, the second rf sensor, or the third rf sensor might include, but is not limited to, a software defined radio ("SDR"), or the like. Merely by way of example, in some cases, the first operating frequency range might center around 5 GHz (with frequency bandwidth ranging from 10 Hz to 500 MHz or the like), while the second operating frequency range might center around 2.4 GHz (with frequency bandwidth ranging from 10 Hz to 500 MHz or the like), and the third operating frequency range might center around 900 MHz (with frequency bandwidth ranging from 10 Hz to 100 MHz or the like), where wireless communications frequencies used for wireless communications between the computing system and the user device (e.g., 2.5 GHz and 5.8 GHz) might be filtered out to avoid potential operational spectrum contention (which might be filtered via software and/or via appropriate placement of antennas, where such antennas might be communicatively coupled to the first, second, and/or third rf sensors).

The lightning bolt symbols in FIG. 2 are used to denote wireless communications between the first antenna 240a and the second antenna 240b, between the first antenna 240a and the third antenna 240c, between the second antenna 240b and the third antenna 240c, between the radio source(s) 245 and the drone 250, and/or the like.

In operation, the first rf sensor—which is disposed on drone 250 and which might have a first operating frequency range (e.g., a range centered around 5 GHz or the like, with frequency bandwidth ranging from 10 Hz to 500 MHz or the like)—might monitor the geographical area 205 to detect any radio signals (such as from radio source(s) 245 or the like) within the first operating frequency range within the geographical area 205. In a similar manner, the second rf sensor—which is disposed on drone 250 and which might have a second operating frequency range (e.g., a range centered around 2.4 GHz or the like, with frequency bandwidth ranging from 10 Hz to 500 MHz or the like)—might monitor the geographical area 205 to detect any radio signals (such as from radio source(s) 245 or the like) within the second operating frequency range within the geographical area 205. In cases that the third rf sensor and the third rf antenna are present and used, the third rf sensor—which is disposed on drone 250 and which might have a third operating frequency range (e.g., a range centered around 900 MHz or the like, with frequency bandwidth ranging from 10 Hz to 100 MHz or the like)—might monitor the geographical area 205 to detect any radio signals (such as from radio source(s) 245 or the like) within the third operating frequency range within the geographical area 205.

The computing system might receive at least one of a first signal from the first rf sensor, a second signal from the second rf sensor, or a third signal from the third rf sensor (in cases where the third rf sensor monitors the geographical area 205) in response to corresponding at least one of the first rf sensor receiving, via the first rf antenna, the first signal within the first operating frequency range, the second rf sensor receiving, via the second rf antenna, the second signal within the second operating frequency range, or the third rf sensor receiving, via the third rf antenna, the third signal within the third operating frequency range (in cases where the third rf sensor monitors the geographical area 205), where the radio source(s) 245 might emit radio frequency signals that are received as corresponding at least one of the first signal, the second signal, or the third signal. The computing system might analyze the received at least one of the first signal, the second signal, or the third signal to identify a frequency range of detected radio signals (i.e., the radio frequency signals emitted by the radio source(s) 245, or the like) within the geographical area 205. The computing system might then send, to the user device 175 (which may be associated with a user (such as an operator, a technician, a representative, or a customer of a service provider, or the like)).

In some embodiments, the geographic area 205 might include, without limitation, a geographic area between two or more sites intended for placement of corresponding two or more antennas (e.g., antennas 240a-240c, or the like), where the two or more antennas might be configured to transmit and send signals within a third frequency range. In such cases, the computing system might analyze the identified frequency range of the detected radio signals to determine whether the identified frequency range overlaps with the third frequency range. Based on a determination that the identified frequency range overlaps with the third frequency range, the computing system might send an alert to the user device of the user indicating presence of potential spectrum contention within the geographic area 205.

According to some embodiments, the two or more antennas (e.g., antennas 240a-240c, or the like) might be installed at the two or more sites (e.g., sites 235a-235c, or the like), and based on a determination that the identified frequency range overlaps with the third frequency range, the computing system might send a set of instructions to tune each of the two or more antennas (e.g., antennas 240a-240c, or the like) to transmit and send signals within a fourth frequency range that does not overlap with the identified frequency range. In some embodiments, the computing system might analyze the received at least one of the first signal or the second signal to determine presence of signal dispersion indicative of obstructions or signal contention.

Figure 3:
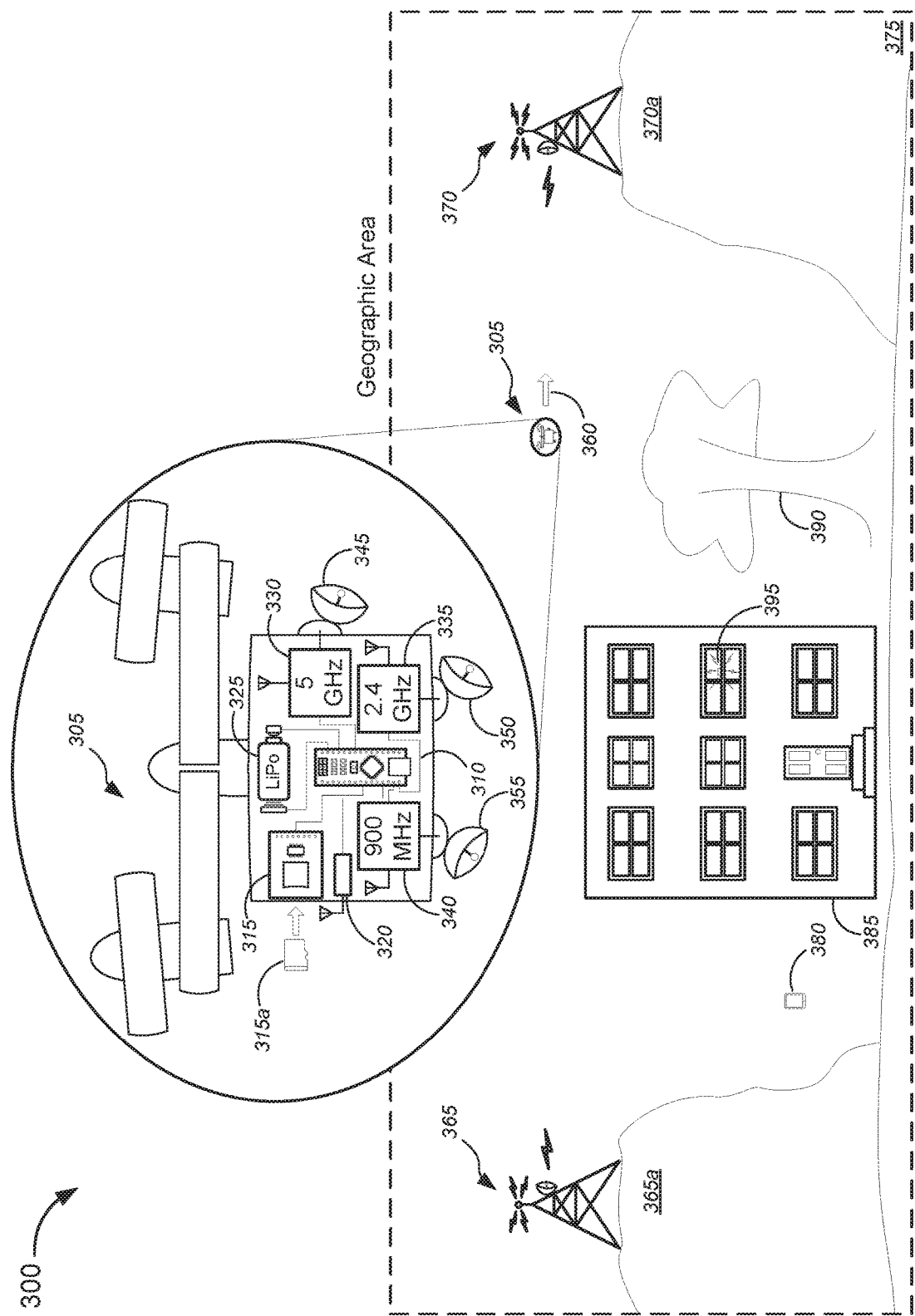
FIG. 3 is a schematic diagram illustrating another non-limiting example of a geographic area in which drone-based rf site survey may be implemented, in accordance with various embodiments.

FIG. 3 is a schematic diagram illustrating another non-limiting example 300 of a geographic area in which drone-based rf site survey may be implemented, in accordance with various embodiments.

In the non-limiting embodiment of FIG. 3, system 300 might comprise a drone 305. In some embodiments, the drone 305 might comprise a computing system 310, a data store 315 (which might include a memory devices, e.g., a secure digital ("SD") card, a microSD card, a compact flash card, a solid-state drive ("SSD") device, or other memory storage devices, or the like), a communications transceiver 320, a power supply 325 (which might include, without limitation, a lithium polymer battery, a lithium ion battery, and/or the like), a first rf sensor 330, a second rf sensor 335, a third rf sensor 340 (optional), a first rf antenna 345, a second rf antenna 350, and a third rf antenna 355 (optional). The first rf antenna 345, the second rf antenna 350, and the third rf antenna 355 (collectively, "rf antennas 345-355" or the like) might communicatively couple, via antenna connectors (e.g., SMA connectors, RP-SMA connectors, UFL connectors, or MMCX connectors, or the like), to corresponding first rf sensor 330, second rf sensor 335, and third rf sensor 340.

In some embodiments, the drone 305 might include, without limitation, one of an aerial drone (as shown in FIG. 3), a land-based drone (not shown), a water-based drone (not shown), or an autonomous vehicle (not shown), and/or the like. In some cases, the computing system 310 might include, but is not limited to, at least one of an open source IoT platform (e.g., NodeMCU, or the like), a microprocessor, a microcontroller (e.g., Arduino Nano microcontroller, or the like), a processor, or a portable computer, and/or the like. According to some embodiments, each of the first rf sensor 330, the second rf sensor 335, or the third rf sensor 340 might include, without limitation, at least one of one or more germanium diode rf detectors, one or more silicon rf detectors, one or more Schottky diode rf detectors, one or more gallium arsenide rf detectors, or one or more copper wires, and/or the like. In some instances, each of the first rf sensor 330, the second rf sensor 335, or the third rf sensor 340 might include, but is not limited to, a software defined radio ("SDR"), or the like. Merely by way of example, in some cases, the first operating frequency range might center around 5 GHz (with frequency bandwidth ranging from 10 Hz to 500 MHz or the like (in some cases in increments of 10 Hz, 100 Hz, 1 kHz, 10 kHz, 100 kHz, 1 MHz, 10 MHz, or 100 MHz, or the like)), while the second operating frequency range might center around 2.4 GHz (with frequency bandwidth ranging from 10 Hz to 500 MHz or the like (in some cases in increments of 10 Hz, 100 Hz, 1 kHz, 10 kHz, 100 kHz, 1 MHz, 10 MHz, or 100 MHz, or the like)), and the third operating frequency range might center around 900 MHz (with frequency bandwidth ranging from 10 Hz to 300 MHz or the like (in some cases in increments of 10 Hz, 100 Hz, 1 kHz, 10 kHz, 100 kHz, 1 MHz, 10 MHz, or 100 MHz, or the like)), where wireless communications frequencies used for wireless communications between the computing system and the user device (e.g., 2.5 GHz and 5.8 GHz) might be filtered out to avoid potential operational spectrum contention (which might be filtered via software and/or via appropriate placement of antennas 345-355, where such antennas 345-355 might be communicatively coupled to the first, second, and/or third rf sensors 330-340). Although the first through third rf sensors 330-345 are depicted and described as being centered around 5 GHz, 2.4 GHz, and 900 MHz, respectively, the various embodiments are not so limited and the rf sensors may be centered around any suitable frequencies to seek out desired frequencies of radio sources within a geographic area. With the case of SDRs being used as rf sensors, changing the center frequencies of the rf sensors can be performed in software.

The computing system 310, data store 315, communications transceiver 320, power supply 325, and first through third rf sensors 340 might be housed within a light and durable enclosure (e.g., rugged hard plastic, metal, or combination of metal and plastic) that forms the exterior of the drone 305. The first through third rf antennas 345-355 may be mounted to the enclosure. As depicted in the non-limiting embodiment of FIG. 3, the first rf antenna 345 (connected to the 5 GHz rf sensor 330) might be mounted on the front (or forward facing) portion of (the exterior enclosure of) the drone 305, with the first rf antenna 345 pointed generally forward (and in some cases, downward as well), e.g., to minimize interference. Also as depicted in FIG. 3, the second rf antenna 350 (connected to the 2.4 GHz rf sensor 335) might be mounted on the middle (and perhaps also on the bottom) portion of (the exterior enclosure of) the drone 305, with the second rf antenna 350 pointed generally downward, e.g., to minimize interference with other software-defined radio ("SDR") circuits. Likewise as depicted in FIG. 3, the third rf antenna 355 (connected to the 900 MHz rf sensor 340) might be mounted on or near the back (or backward facing) portion of (the exterior enclosure of) the drone 305, with the third rf antenna 355 pointed generally backward (and in some cases, downward as well).

In some embodiments, system 300 might further comprise a first antenna 365 disposed at a first site 365*a* (e.g., a hill, a mountain, or a rise, or the like) and a second antenna 370 disposed at a first site 365*a* (e.g., a hill-top, a mountain-top, a plateau, or a rise, or the like) that are disposed within a geographic or geographical area 375. The drone 300 might travel along a path between the first antenna 365 and the second antenna 370 (as depicted by arrow 360). In some cases, each of the first antenna 365 or the second antenna 370 might include, without limitation, at least one of a parabolic reflector-based antenna, a Yagi-Uda antenna, a beam antenna, a parasitic array antenna, a loop antenna, a dipole antenna, or a monopole antenna, and/or the like. According to some embodiments, the geographic area 375 might include, without limitation, one of a customer premises, a residential neighborhood, a business district, a city block, an open nature space, a park, a forest, a mountain range, a valley, or a lake side area, and/or the like. In some cases, the geographic area 375 might include, but is not limited to, a geographic area along a travel path of the drone 305 (e.g., as depicted by arrow 360, or the like), where the travel path is along a radio signal transmission path between two sites 365*a* and 370*a* that are used (or intended) for placement of corresponding two antennas 365 and 370.

System 300 might further comprise a user device 380 associated with a user—including, but not limited to, an operator, a technician, a representative, or a customer of a service provider, or the like. According to some embodiments, system 300 might further comprise one or more radio sources 395, which might include, without limitation, one or more unregistered radio sources, one or more registered radio sources, one or more amateur radio sources, one or more cellular phones, one or more cordless phones, one or more local wireless networks, one or more WiFi sources or transceivers, one or more medical scanners, one or more microwave ovens, one or more radio frequency identification ("RFID") tags, one or more FM radios, one or more AM radios, one or more television broadcasting systems, one or more radar sources, very low frequency ("VLF") sources, low frequency ("LF") sources, medium frequency ("MF") sources, high frequency ("HF") sources, very high frequency ("VHF") sources, ultra high frequency ("UHF") sources, super high frequency ("SHF") sources, extremely high frequency ("EHF") sources, tremendously high frequency ("THF") sources, or radio signals reflecting off buildings (e.g., building(s) 385, or the like), man-made structures, foliage or flora (e.g., tree(s) 390), or other obstructions, and/or the like.

The lightning bolt symbols in FIG. 3 are used to denote wireless communications between the first antenna 365 and the second antenna 370, between the radio source(s) 395 and the first rf sensor 330 via the first rf antenna 345, between the radio source(s) 395 and the second rf sensor 335 via the second rf antenna 350, between the radio source(s) 395 and the third rf sensor 340 via the third rf antenna 355, and/or the like.

In operation, the first rf sensor 330—which is disposed on drone 305 and which might have a first operating frequency range (e.g., a range centered around 5 GHz or the like, with frequency bandwidth ranging from 10 Hz to 500 MHz or the like)—might monitor the geographical area 375 to detect any radio signals (such as from radio source(s) 395 or the like) within the first operating frequency range within the geographical area 375. In a similar manner, the second rf sensor 335—which is disposed on drone 305 and which might have a second operating frequency range (e.g., a range centered around 2.4 GHz or the like, with frequency bandwidth ranging from 10 Hz to 500 MHz or the like)—might monitor the geographical area 375 to detect any radio signals (such as from radio source(s) 395 or the like) within the second operating frequency range within the geographical area 375. In cases that the third rf sensor 340 and the third rf antenna 355 are present and used, the third rf sensor 340—which is disposed on drone 305 and which might have a third operating frequency range (e.g., a range centered around 900 MHz or the like, with frequency bandwidth ranging from 10 Hz to 300 MHz or the like)—might monitor the geographical area 375 to detect any radio signals (such as from radio source(s) 395 or the like) within the third operating frequency range within the geographical area 375.

The computing system 310 might receive at least one of a first signal from the first rf sensor 330, a second signal from the second rf sensor 335, or a third signal from the third rf sensor 340 (in cases where the third rf sensor 340 monitors the geographical area 375) in response to corresponding at least one of the first rf sensor 330 receiving, via the first rf antenna 345, the first signal within the first operating frequency range, the second rf sensor 335 receiving, via the second rf antenna 350, the second signal within the second operating frequency range, or the third rf sensor 340 receiving, via the third rf antenna 355, the third signal within the third operating frequency range (in cases where the third rf sensor 340 monitors the geographical area 375), where the radio source(s) 395 might emit radio frequency signals that are received as corresponding at least one of the first signal, the second signal, or the third signal. The computing system 310 might analyze the received at least one of the first signal, the second signal, or the third signal to identify a frequency range of detected radio signals (i.e., the radio frequency signals emitted by the radio source(s) 395, or the like) within the geographical area 375. The computing system 310 might then send, to the user device 380 (which may be associated with a user (such as an operator, a technician, a representative, or a customer of a service provider, or the like).

In some embodiments, the geographic area 375 might include, without limitation, a geographic area between two or more sites intended for placement of corresponding two or more antennas (e.g., antennas 365 and 370, or the like), where the two or more antennas might be configured to transmit and send signals within a third frequency range. In such cases, the computing system 310 might analyze the identified frequency range of the detected radio signals to determine whether the identified frequency range overlaps with the third frequency range. Based on a determination that the identified frequency range overlaps with the third frequency range, the computing system 310 might send an alert to the user device of the user indicating presence of potential spectrum contention within the geographic area 375.

According to some embodiments, the two or more antennas might be installed at the two or more sites, and based on a determination that the identified frequency range overlaps with the third frequency range, the computing system 310 might send a set of instructions to tune each of the two or more antennas (e.g., antennas 365 and 370, or the like) to transmit and send signals within a fourth frequency range that does not overlap with the identified frequency range. In some embodiments, the computing system 310 might analyze the received at least one of the first signal or the second signal to determine presence of signal dispersion indicative of obstructions or signal contention.

When using aerial site surveys, a drone-based system might capture data regarding obstructions (e.g., towers, trees (e.g., tree 390), buildings (e.g., building 385), etc.) that might cause signal dispersion but does not natively capture data regarding spectrum use. Since the drone 305 can fly down a radio path (i.e., between a first and second antenna (e.g., antennas 365 and 370), it is important to capture spectrum contention in the path. The drone-based system of FIG. 3 might write or store spectrum details along the path (as depicted by the arrow 360) to or on the data store 315 (e.g., on a micro SD card, or the like) so that the data can be made available to architects of the radio transmission solution. This allows the architects to tune the radio transmission solution around spectrum contention constraints. For example, if the drone 305 (via the various rf sensors 330-340) detects or senses spectrum in the 908-925 MHz range from a radio source (e.g., radio source 395) operated by an amateur ham radio operator (e.g., located in building 385 or the like) between the first and second antennas 365 and 370, the architects might use that information to tune a radio transmission solution that is centered around or near 900 MHz to signals ranging between 902-908 MHz or 926-932 MHz. If such radio source 395 is discovered using the drone-based system before installation of the first and second antennas 365-370, the architects might design a transmission system that centers around a different frequency other than 900 MHz to avoid potential spectrum contention with the existing sources (in this example, a ham radio source between 908 and 925 MHz).

Figure 4A:
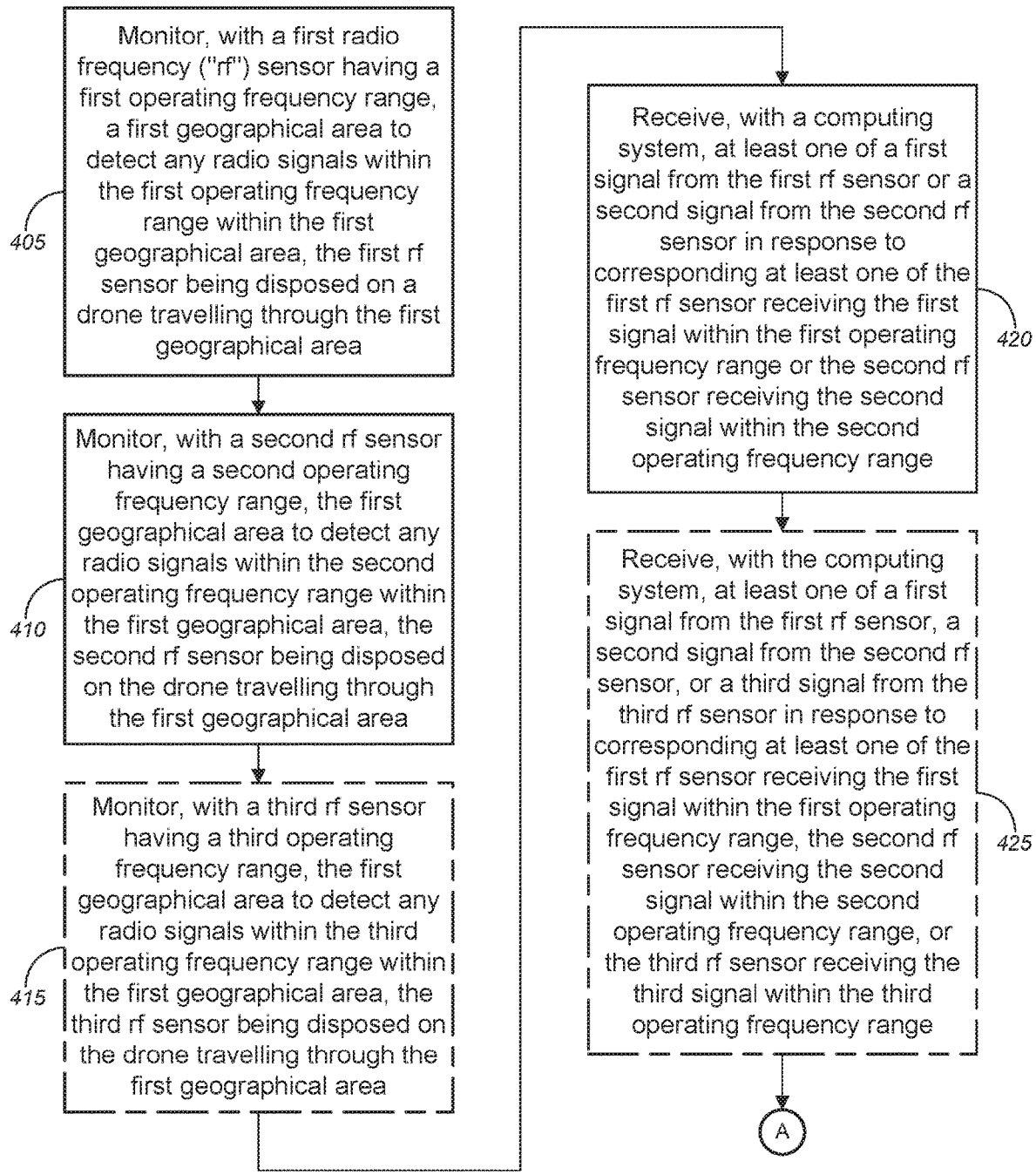
FIGS. 4A and 4B are flow diagrams illustrating a method for implementing drone-based rf site survey, in accordance with various embodiments.
Figure 4B:
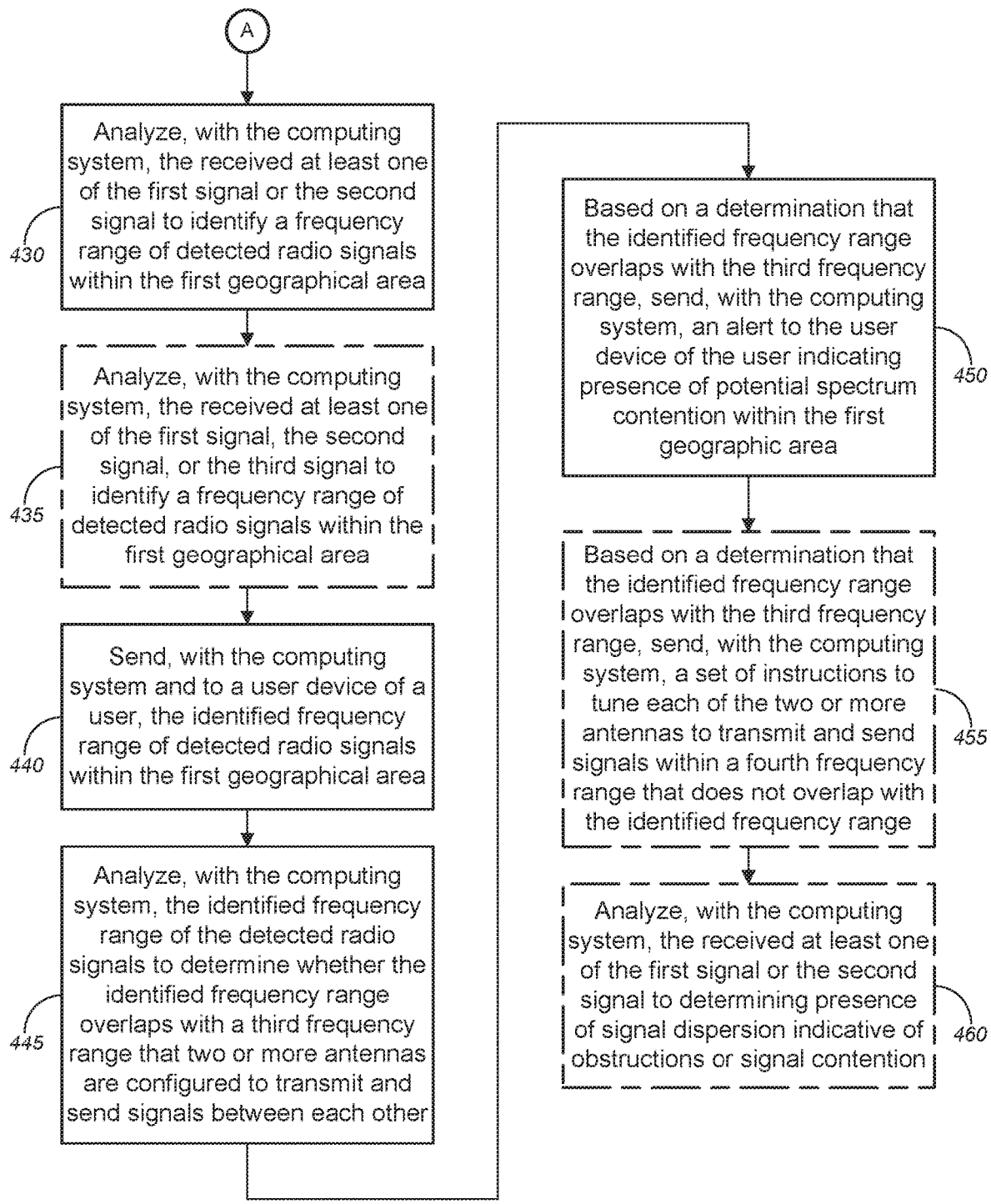

FIGS. 4A and 4B (collectively, "FIG. 4") are flow diagrams illustrating a method 400 for implementing drone-based rf site survey, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, might comprise monitoring, with a first radio frequency ("rf") sensor having a first operating frequency range, a first geographical area to detect any radio signals within the first operating frequency range within the first geographical area, the first rf sensor being disposed on a drone travelling through the first geographical area. At block 410, method 400 might comprise monitoring, with a second rf sensor having a second operating frequency range, the first geographical area to detect any radio signals within the second operating frequency range within the first geographical area, the second rf sensor being disposed on the drone travelling through the first geographical area. Method 400 might further comprise, at optional block 415, monitoring, with a third rf sensor having a third operating frequency range, the first geographical area to detect any radio signals within the third operating frequency range within the first geographical area, the third rf sensor being disposed on the drone travelling through the first geographical area.

Method 400 might further comprise receiving, with a computing system, at least one of a first signal from the first rf sensor or a second signal from the second rf sensor in response to corresponding at least one of the first rf sensor receiving the first signal within the first operating frequency range or the second rf sensor receiving the second signal within the second operating frequency range (block 420). Alternatively, at optional block 425, method 400 might comprise receiving, with the computing system, at least one of a first signal from the first rf sensor, a second signal from the second rf sensor, or a third signal from the third rf sensor (in cases where the third rf sensor monitors the first geographical area) in response to corresponding at least one of the first rf sensor receiving the first signal within the first operating frequency range, the second rf sensor receiving the second signal within the second operating frequency range, or the third rf sensor receiving the third signal within the third operating frequency range (in cases where the third rf sensor monitors the first geographical area). Method 400 might continue onto the process at block 430 in FIG. 4B following the circular marker denoted, "A."

At block 430 in FIG. 4B (following the circular marker denoted, "A"), method 400 might comprise analyzing, with the computing system, the received at least one of the first signal or the second signal to identify a frequency range of detected radio signals within the first geographical area. Alternatively, at optional block 435, method 400 might comprise analyzing, with the computing system, the received at least one of the first signal, the second signal, or the third signal (in cases where the third rf sensor monitors the first geographical area) to identify a frequency range of detected radio signals within the first geographical area. Method 400 might further comprise sending, with the computing system and to a user device of a user, the identified frequency range of detected radio signals within the first geographical area (block 440).

In some embodiments, the drone might include, without limitation, one of an aerial drone, a land-based drone, a water-based drone, or an autonomous vehicle, and/or the like. In some cases, the computing system might include, but is not limited to, at least one of an open source IoT platform, a microprocessor, a microcontroller, a processor, a portable computer, a server, a distributed computing system, or a cloud-based computing system, and/or the like. According to some embodiments, each of the first rf sensor, the second rf sensor, or the third rf sensor might include, without limitation, at least one of one or more germanium diode rf detectors, one or more silicon rf detectors, one or more Schottky diode rf detectors, one or more gallium arsenide rf detectors, or one or more copper wires, and/or the like. In some instances, each of the first rf sensor, the second rf sensor, or the third rf sensor might include, but is not limited to, a software defined radio ("SDR"), or the like. Merely by way of example, in some cases, the first operating frequency range might center around 5 GHz, while the second operating frequency range might center around 2.4 GHz, and the third operating frequency range might center around 900 MHz, where wireless communications frequencies used for wireless communications between the computing system and the user device (e.g., 2.5 GHz and 5.8 GHz) might be filtered out to avoid potential operational spectrum contention (which might be filtered via software and/or via appropriate antenna placement, where such antennas might be communicatively coupled to the first, second, and/or third rf sensors).

According to some embodiments, the first geographic area might include, without limitation, one of a customer premises, a residential neighborhood, a business district, a city block, an open nature space, a park, a forest, a mountain range, a valley, or a lake side area, and/or the like. In some cases, the first geographic area might include, but is not limited to, a geographic area along a travel path of the drone, where the travel path is along a radio signal transmission path between two sites intended for placement of corresponding two antennas.

In some embodiments, the first geographic area might include, without limitation, a geographic area between two or more sites intended for placement of corresponding two or more antennas, where the two or more antennas might be configured to transmit and send signals within a third frequency range. In such cases, method 400 might further comprise analyzing, with the computing system, the identified frequency range of the detected radio signals to determine whether the identified frequency range overlaps with the third frequency range (block 445) and, based on a determination that the identified frequency range overlaps with the third frequency range, sending, with the computing system, an alert to the user device of the user indicating presence of potential spectrum contention within the first geographic area (block 450).

According to some embodiments, the two or more antennas might be installed at the two or more sites, and method 400 might further comprise, at optional block 455, based on a determination that the identified frequency range overlaps with the third frequency range, sending, with the computing system, a set of instructions to tune each of the two or more antennas to transmit and send signals within a fourth frequency range that does not overlap with the identified frequency range. In some embodiments, at optional block 460, analyzing, with the computing system, the received at least one of the first signal or the second signal to determine presence of signal dispersion indicative of obstructions or signal contention.

Exemplary System and Hardware Implementation

Figure 5:
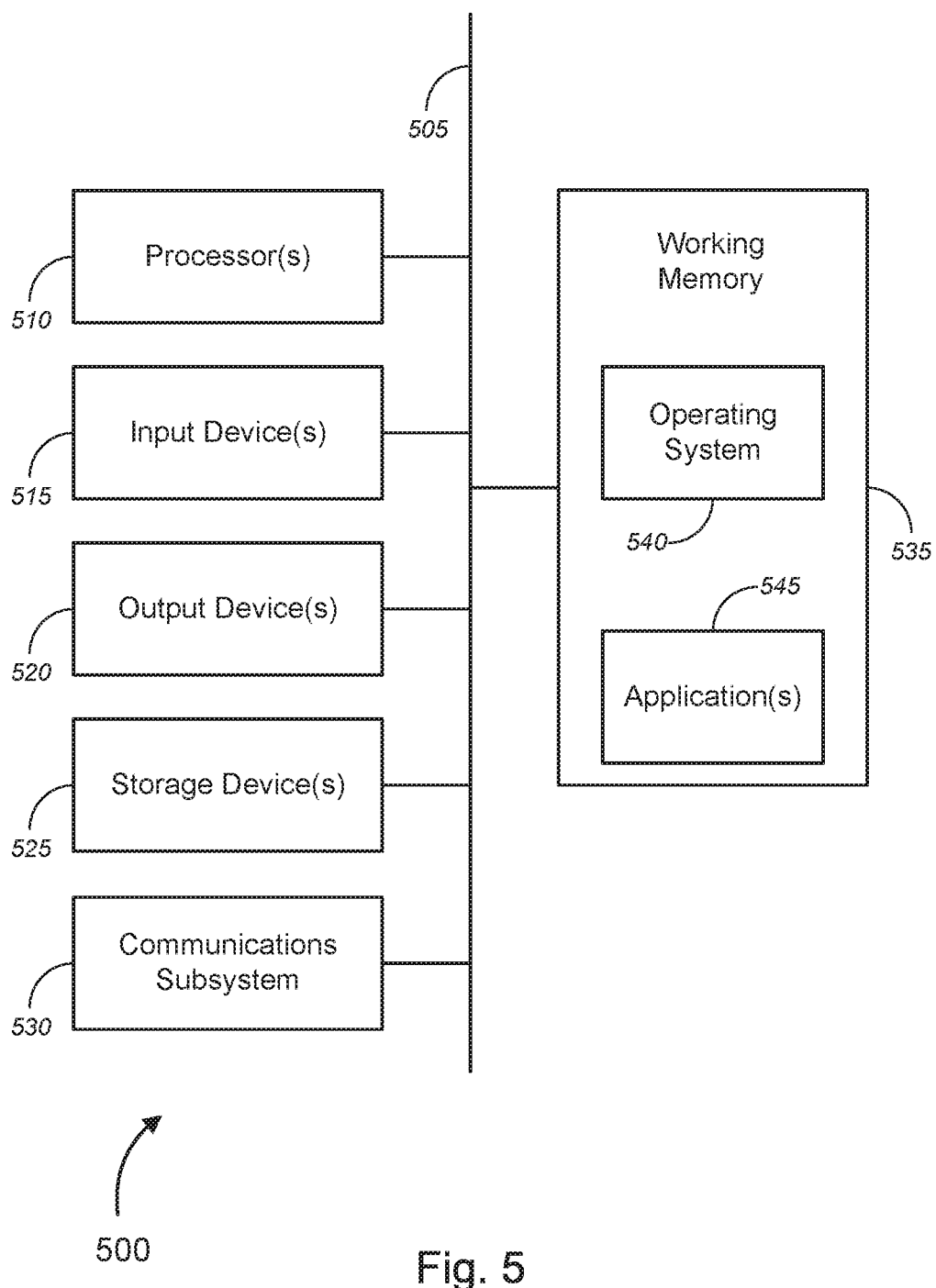
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., drones 105, 250, and 305, computing systems 110 and 310, data stores 115 and 315, communications transceivers 120 and 320, radio frequency ("rf") sensors 130, 135, 140, 330, 335, and 340, user devices 175 and 380, remote computing system 185, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., drones 105, 250, and 305, computing systems 110 and 310, data stores 115 and 315, communications transceivers 120 and 320, rf sensors 130, 135, 140, 330, 335, and 340, user devices 175 and 380, remote computing system 185, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
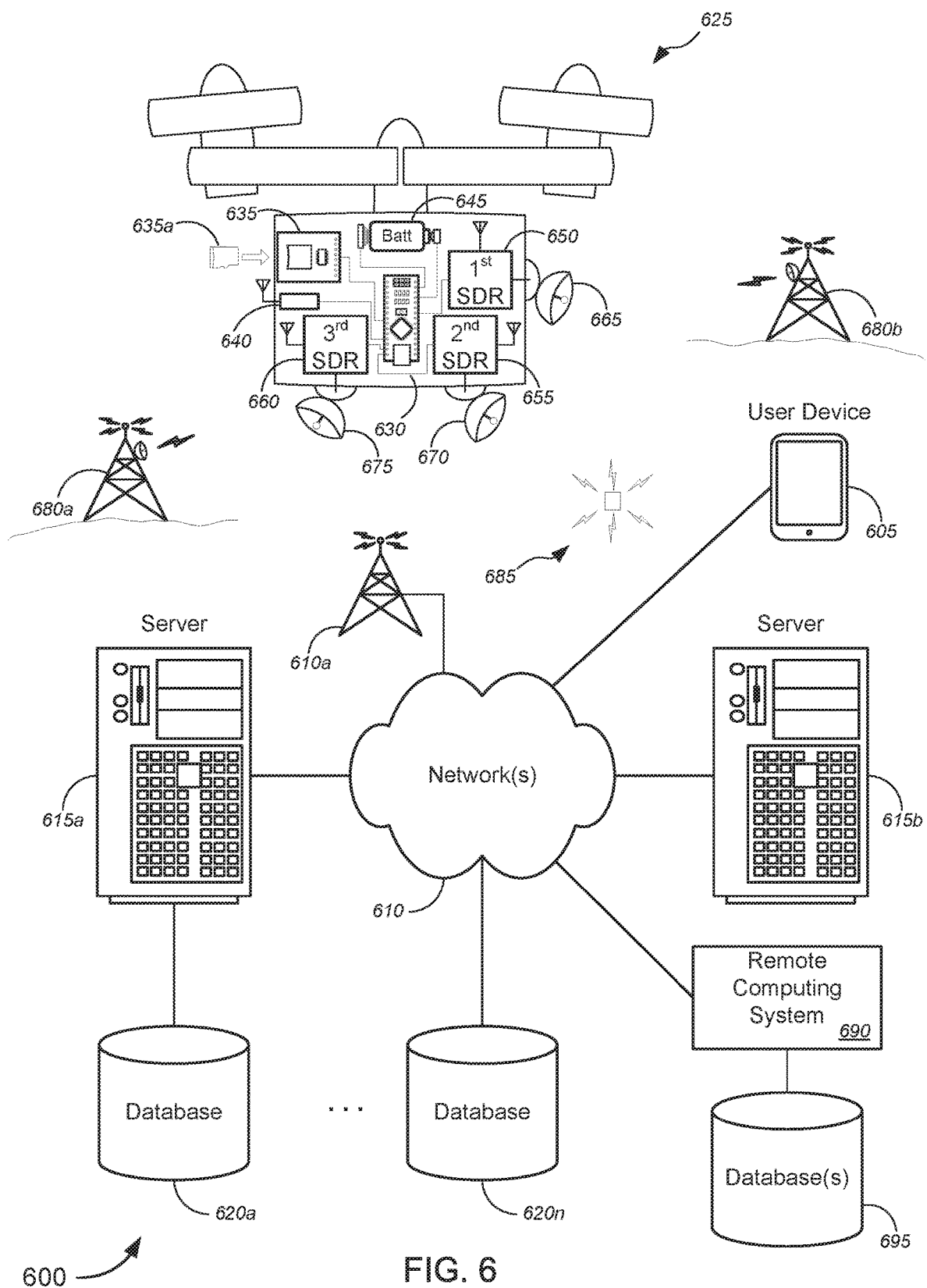
FIG. 6 is a block diagram illustrating a networked system of computers, computing systems, or system hardware architecture, which can be used in accordance with various embodiments.

As noted above, a set of embodiments comprises methods and systems for implementing site survey, and, more particularly, to methods, systems, and apparatuses for implementing drone-based radio frequency ("rf") site survey. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with one user computer, user device, or customer device 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 190 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing site survey, and, more particularly, to methods, systems, and apparatuses for implementing drone-based rf site survey, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a drone 625 (similar to drones 105, 250, and 305 of FIGS. 1-3, or the like). The drone 625 might comprise a computing system 630 (similar to computing systems 110 and 310 of FIGS. 1 and 3, or the like), a data store 635 (similar to data stores 115 and 315 of FIGS. 1 and 3, or the like), a communications transceiver 640 (similar to communications transceivers 120 and 320 of FIGS. 1 and 3, or the like), a power supply 645 (similar to power supplies 125 and 325 of FIGS. 1 and 3, or the like), first radio frequency ("rf") sensor 650, second rf sensor 655, third rf sensor 660, a first rf antenna 665, a second rf antenna 670, and a third rf antenna 675. The first rf antenna 665, the second rf antenna 670, and the third rf antenna 675 (collectively, "rf antennas 665-675" or the like; similar to rf sensors 130, 135, 140, 330, 335, and 340 of FIGS. 1 and 3, or the like) might communicatively couple to corresponding first rf sensor 650, second rf sensor 655, and third rf sensor 660 (collectively, "rf sensors 650-660" or the like; similar to rf antennas 145, 150, 155, 345, 350, and 355 of FIGS. 1 and 3, or the like).

In some embodiments, system 600 might further comprise a first communications antenna 680a and a second communications antenna 680b, a radio source(s) 685, and a remote computing system 690 (similar to remote computing system 185 of FIG. 1, or the like) and corresponding database(s) 695.

In operation, the first rf sensor 650, which might have a first operating frequency range (e.g., a range centered around 5 GHz or the like, with frequency bandwidth ranging from 10 Hz to 500 MHz or the like), might monitor, via first rf antenna 665, a first geographical area to detect any radio signals within the first operating frequency range within the first geographical area. The second rf sensor 655, which might have a second operating frequency range (e.g., a range centered around 2.4 GHz or the like, with frequency bandwidth ranging from 10 Hz to 500 MHz or the like), might monitor, via second rf antenna 670, the first geographical area to detect any radio signals within the second operating frequency range within the first geographical area. Optionally, the third rf sensor 660, which might have a third operating frequency range (e.g., a range centered around 900 MHz or the like, with frequency bandwidth ranging from 10 Hz to 100 MHz or the like), might monitor, via third rf antenna 675, the first geographical area to detect any radio signals within the third operating frequency range within the first geographical area. The drone 625—on which the first rf sensor 650, the second rf sensor 655, and the third rf sensor 660 are disposed—might travel through the first geographical area.

The computing system 630 (and in some cases, remote computing system 690) might receive at least one of a first signal from the first rf sensor 650, a second signal from the second rf sensor 655, or a third signal from the third rf sensor 660 (in cases where the third rf sensor 660 monitors the first geographical area) in response to corresponding at least one of the first rf sensor 650 receiving, via the first rf antenna 665, the first signal within the first operating frequency range, the second rf sensor 655 receiving, via the second rf antenna 670, the second signal within the second operating frequency range, or the third rf sensor 660 receiving, via the third rf antenna 675, the third signal within the third operating frequency range (in cases where the third rf sensor 660 monitors the first geographical area), where the radio source(s) 685 might emit radio frequency signals that are received as corresponding at least one of the first signal, the second signal, or the third signal. The computing system 630 (and in some cases, remote computing system 690) might analyze the received at least one of the first signal, the second signal, or the third signal to identify a frequency range of detected radio signals (i.e., the radio frequency signals emitted by the radio source(s) 685, or the like) within the first geographical area. The computing system 630 (and in some cases, remote computing system 690) might then send, to the user device 605 (which may be associated with a user (such as an operator, a technician, a representative, or a customer of a service provider, or the like).

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
monitoring, with a first radio frequency ("rf") sensor having a first operating frequency range, a first geographical area to detect any radio signals within the first operating frequency range within the first geographical area, the first rf sensor being disposed on a drone travelling through the first geographical area;
monitoring, with a second rf sensor having a second operating frequency range, the first geographical area to detect any radio signals within the second operating frequency range within the first geographical area, the second rf sensor being disposed on the drone travelling through the first geographical area;
receiving, with a computing system, at least one of a first signal from the first rf sensor or a second signal from the second rf sensor in response to corresponding at least one of the first rf sensor receiving the first signal within the first operating frequency range or the second rf sensor receiving the second signal within the second operating frequency range;

analyzing, with the computing system, the received at least one of the first signal or the second signal to identify a frequency range of detected radio signals within the first geographical area;

analyzing, with the computing system, the received at least one of the first signal or the second signal to determine presence of signal dispersion indicative of obstructions or signal contention; and sending, with the computing system and to a user device of a user, the identified frequency range of detected radio signals within the first geographical area.

2. The method of claim 1, wherein the drone comprises one of an aerial drone, a land-based drone, a water-based drone, or an autonomous vehicle.

3. The method of claim 1, wherein the computing system comprises at least one of an open source IoT platform, a microprocessor, a microcontroller, a processor, a portable computer, a server, a distributed computing system, or a cloud-based computing system.

4. The method of claim 1, wherein each of the first rf sensor or the second rf sensor comprises at least one of one or more germanium diode rf detectors, one or more silicon rf detectors, one or more Schottky diode rf detectors, one or more gallium arsenide rf detectors, or one or more copper wires.

5. The method of claim 1, wherein each of the first rf sensor or the second rf sensor comprises a software defined radio ("SDR").

6. The method of claim 1, wherein the first geographic area comprises one of a customer premises, a residential neighborhood, a business district, a city block, an open nature space, a park, a forest, a mountain range, a valley, or a lake side area.

7. The method of claim 1, wherein the first geographic area comprises a geographic area along a travel path of the drone, wherein the travel path is along a radio signal transmission path between two sites intended for placement of corresponding two antennas.

8. The method of claim 1, wherein the first geographic area comprises a geographic area between two or more sites intended for placement of corresponding two or more antennas, wherein the two or more antennas are configured to transmit and send signals within a third frequency range, wherein the method further comprises:

analyzing, with the computing system, the identified frequency range of the detected radio signals to determine whether the identified frequency range overlaps with the third frequency range; and based on a determination that the identified frequency range overlaps with the third frequency range, sending, with the computing system, an alert to the user device of the user indicating presence of potential spectrum contention within the first geographic area.

9. The method of claim 8, wherein the two or more antennas are installed at the two or more sites, wherein the method further comprises:

based on a determination that the identified frequency range overlaps with the third frequency range, sending, with the computing system, a set of instructions to tune each of the two or more antennas to transmit and send signals within a fourth frequency range that does not overlap with the identified frequency range.

10. The method of claim 1, further comprising:

monitoring, with a third rf sensor having a third operating frequency range, the first geographical area to detect any radio signals within the third operating frequency range within the first geographical area, the third rf sensor being disposed on the drone travelling through the first geographical area;

wherein receiving the at least one of the first signal from the first rf sensor or the second signal from the second rf sensor comprises receiving, with the computing system, at least one of a first signal from the first rf sensor, a second signal from the second rf sensor, or a third signal from the third rf sensor in response to corresponding at least one of the first rf sensor receiving the first signal within the first operating frequency range, the second rf sensor receiving the second signal within the second operating frequency range, or the third rf sensor receiving the third signal within the third operating frequency range; and wherein analyzing the received at least one of the first signal or the second signal comprises analyzing, with the computing system, the received at least one of the first signal, the second signal, or the third signal to identify a frequency range of detected radio signals within the first geographical area.

11. The method of claim 10, wherein the first operating frequency range centers around 5 GHz, wherein the second operating frequency range centers around 2.4 GHz, wherein the third operating frequency range centers around 900 MHz, wherein wireless communications frequencies used for wireless communications between the computing system and the user device are filtered out to avoid potential operational spectrum contention.

12. A drone configured to implement radio frequency ("rf") site survey, the drone comprising:

a first rf sensor having a first operating frequency range;

a second rf sensor having a second operating frequency range; and a computing system, comprising:

at least one processor; and a non-transitory computer readable medium communicatively coupled to the at least one processor, the non-transitory computer readable medium having stored thereon computer software comprising a set of instructions that, when executed by the at least one processor, causes the computing system to:

receive at least one of a first signal from the first rf sensor or a second signal from the second rf sensor in response to corresponding at least one of the first rf sensor receiving the first signal within the first operating frequency range or the second rf sensor receiving the second signal within the second operating frequency range as the drone travels through a first geographical area;

analyze the received at least one of the first signal or the second signal to identify a frequency range of detected radio signals within the first geographical area;

analyze the received at least one of the first signal or the second signal to determine presence of signal dispersion indicative of obstructions or signal contention; and send, to a user device of a user, the identified frequency range of detected radio signals within the first geographical area.

13. The drone of claim 12, wherein the drone comprises one of an aerial drone, a land-based drone, a water-based drone, or an autonomous vehicle.

14. The drone of claim 12, wherein the computing system comprises at least one of an open source IoT platform, a microprocessor, a microcontroller, a processor, a portable computer, a server, a distributed computing system, or a cloud-based computing system.

15. The drone of claim 12, wherein each of the first rf sensor or the second rf sensor comprises at least one of one or more germanium diode rf detectors, one or more silicon rf detectors, one or more Schottky diode rf detectors, one or more gallium arsenide rf detectors, or one or more copper wires.

16. The drone of claim 12, wherein each of the first rf sensor or the second rf sensor comprises a software defined radio ("SDR").

17. The drone of claim 12, wherein the first geographic area comprises a geographic area between two or more sites intended for placement of corresponding two or more antennas, wherein the two or more antennas are configured to transmit and send signals within a third frequency range, wherein the set of instructions, when executed by the at least one processor, further causes the computing system to:
    analyze the identified frequency range of the detected radio signals to determine whether the identified frequency range overlaps with the third frequency range; and
    based on a determination that the identified frequency range overlaps with the third frequency range, send an alert to the user device of the user indicating presence of potential spectrum contention within the first geographic area.

18. The drone of claim 12, further comprises:
    a third rf sensor having a third operating frequency range;
    wherein receiving the at least one of the first signal from the first rf sensor or the second signal from the second rf sensor comprises receiving at least one of a first signal from the first rf sensor, a second signal from the second rf sensor, or a third signal from the third rf sensor in response to corresponding at least one of the first rf sensor receiving the first signal within the first operating frequency range, the second rf sensor receiving the second signal within the second operating frequency range, or the third rf sensor receiving the third signal within the third operating frequency range; and
    wherein analyzing the received at least one of the first signal or the second signal comprises analyzing the received at least one of the first signal, the second signal, or the third signal to identify a frequency range of detected radio signals within the first geographical area.

19. The drone of claim 18, wherein the first operating frequency range centers around 5 GHz, wherein the second operating frequency range centers around 2.4 GHz, wherein the third operating frequency range centers around 900 MHz, wherein wireless communications frequencies used for wireless communications between the computing system and the user device are filtered out to avoid potential operational spectrum contention.

* * * * *